United States Patent
Popkey

(10) Patent No.: US 6,579,102 B2
(45) Date of Patent: Jun. 17, 2003

(54) APPARATUS AND METHOD FOR STIMULATING CREATIVITY, SPONTANEITY, AND INSPIRATION

(76) Inventor: David A. Popkey, 13836 Bora Bora Way, Suite B107, Marina Del Rey, CA (US) 90292

( * ) Notice: Subject to any disclaimer, the term of this patent is extended or adjusted under 35 U.S.C. 154(b) by 121 days.

(21) Appl. No.: 09/948,403

(22) Filed: Sep. 6, 2001

(65) Prior Publication Data

US 2003/0044756 A1 Mar. 6, 2003

(51) Int. Cl.[7] .............................................. G09B 11/00
(52) U.S. Cl. ........................... 434/236; 434/81; 434/165
(58) Field of Search ................................ 434/165, 236, 434/237, 238, 81, 84, 156, 162

(56) References Cited

U.S. PATENT DOCUMENTS

| | | | | |
|---|---|---|---|---|
| 3,840,113 | A | * 10/1974 | Bartleson | 206/575 |
| 4,445,869 | A | * 5/1984 | Wasserman | 434/156 |
| 4,604,062 | A | * 8/1986 | Woods | 434/88 |
| 4,637,799 | A | * 1/1987 | Bouchal | 434/236 |
| 4,684,135 | A | * 8/1987 | Bouchal | 273/269 |
| 5,135,399 | A | * 8/1992 | Ryan | 434/236 |
| 5,435,726 | A | * 7/1995 | Taylor | 434/128 |
| 5,657,992 | A | * 8/1997 | Bellizzi | 273/273 |
| 5,660,548 | A | * 8/1997 | Ellenbogen | 434/167 |
| 5,738,548 | A | * 4/1998 | Rutulante | 439/652 |

FOREIGN PATENT DOCUMENTS

EP 0193816 * 2/1986

* cited by examiner

Primary Examiner—Kien T. Nguyen
(74) Attorney, Agent, or Firm—David A. Belasco; Belasco Jacobs & Townsley, LLP

(57) ABSTRACT

An apparatus and method for stimulating creativity, spontaneity and inspiration includes a container that has a removable lid, interior surfaces and exterior surfaces. A series of journal writing, life, artistic and summary writing exercises are enclosed in the lid. Each of the writing exercises is focused upon one of a group of identified blocking influences. Each of the life exercises is a physical or mental activity for life style enhancement and is focused upon one of a group of methods of stimulating creative processes. Each of the artistic exercises is focused upon one of a group of artistic media. A collection of art supplies suitable for completion of the artistic exercises is provided. The summary writing exercises are focused on recording the results of each of the journal writing, life and artistic exercises. When a user opens the container and completes each of the exercises as instructed, the user will mitigate effects of the identified blocking influences and increase his creativity, spontaneity, and inspiration. The identified blocking influences include stress, negativity, procrastination, frustration, perfectionism and self-criticism. The exercises are organized into a structured program that includes a series of predetermined time periods. One of each of the exercises is to be completed in one of the predetermined time periods. Each of the exercises to be completed in one of the predetermined time periods is focused on one of the identified blocking influences. The structured program further includes mission statements, tips, and techniques identified for each predetermined time period.

12 Claims, 6 Drawing Sheets

| Time Period | Day 1 | Day 2 | Day 3 | Day 4 | Day 5 | Day 6 |
|---|---|---|---|---|---|---|
| Blocking Influence | Stress | Negativity | Procrastination | Frustration | Perfectionism | Self-criticism |
| Journal Writing Exercise | Write how stress is affecting your life. | Journal all thoughts of negativity about yourself, at work or any situation. | Try to answer the question, "What am I afraid of?" Writing the fears down helps you see them objectively. | There are many things we wish we could control but are unable to. Write down some of the things that caused you to be frustrated recently. | Write down recent mistakes you have made creatively and list all the things you learned from it. | Counteract the critic's influence by building self-esteem. Emphasizing our strengths does this. Journal about all accomplishments. |
| Life Exercise | Take one short walk and regular breaks throughout the day. | Catch yourself looking at the glass half empty instead of half full. | Throughout today, attempt to catch yourself procrastinating and take action. | Maintain your power by realizing the only thing that you can control in life is your emotional reaction. | Give yourself permission to make mistakes. Through mistakes, wonderful breakthroughs can occur. | Monitor your inner critic as it generates feelings of guilt, frustration, and fears of failure. |
| Artistic Exercise | Paint Terra Cotta Pot and plant the lavender seeds. Gardening is an excellent way to reduce stress. Lavender is used for aromatherapy. | Create sumo wrestlers out of clay. They will help you to fight the negative forces in your life. | Create a Motivational Frame from the supplied frame and mosaic pieces. Place a picture of something inspirational to motivate yourself. | Decorate the card in the box. Write a message, a poem or an inspirational quote in the card and give it to someone in your life you need to reconnect with. Take control. | Stir the creative juices by completely covering your block by finger-painting. Get messy. | Collage the inside of the block with magazine clipping and photos of the person you see yourself as in the future. This is essentially a positive self-portrait of yourself. |
| Summary Writing Exercise | Congratulate yourself for starting. Release all thoughts and concerns by writing them down on a piece of paper. | Release all thoughts and concerns by writing them down on a piece of paper. This will clear your mind for rest. | Release all thoughts and concerns by writing them down on a piece of paper. This will clear your mind for rest. | Release all thoughts and concerns by writing them down on a piece of paper. This will clear your mind for rest. | Write briefly about how you felt about today's artistic exercise. Clear your mind by writing down all thoughts and concerns. | Congratulate yourself for you have transformed your block into a center of creativity and a source for inspiration. |

Fig. 8

| Time Period | Day 1 | Day 2 | Day 3 | Day 4 | Day 5 | Day 6 |
|---|---|---|---|---|---|---|
| Blocking Influence | Stress | Negativity | Procrastination | Frustration | Perfectionism | Self-criticism |
| Mission Statements | Today's creative mission: Reduce stress (the blocker of inspiration). | Today's creative mission: Catch your negative thoughts. | Today's creative mission: Step beyond the fear known as procrastination. | Today's creative mission: Stop frustration from interfering with the creative process. | Creative Mission: Turn down the Perfectionism dial and make a few mistakes. | Congratulations, you have reached day six. Today's creative mission: stop self-criticism. |
| Journal Writing Exercise | Write how stress is affecting your life. | Journal all thoughts of negativity about yourself, at work or any situation. | Try to answer the question, "What am I afraid of?" Writing the fears down helps you see them objectively. | There are many things we wish we could control but are unable to. Write down some of the things that caused you to be frustrated recently. | Write down recent mistakes you have made creatively and list all the things you learned from it. | Counteract the critic's influence by building self-esteem. Emphasizing our strengths does this. Journal about all accomplishments. |
| Life Exercise | Take one short walk and regular breaks throughout the day. | Catch yourself looking at the glass half empty instead of half full. | Throughout today, attempt to catch yourself procrastinating and take action. | Maintain your power by realizing the only thing that you can control in life is your emotional reaction. | Give yourself permission to make mistakes. Through mistakes, wonderful breakthroughs can occur. | Monitor your inner critic as it generates feelings of guilt, frustration, and fears of failure. |
| Tips | The following is a simple yoga breathing exercise. | Remember that for every negative you can find a positive. | Do the most difficult tasks first. | If you feel frustrated, walk away and continue a few minutes later. | Life is not about reaching the destination; it is about enjoying the journey. | Try to replace negative thoughts with positive affirmations. |
| Artistic Exercise | Paint Terra Cotta Pot and plant the lavender seeds. Gardening is an excellent way to reduce stress. Lavender is used for aromatherapy. | Create sumo wrestlers out of clay. They will help you to fight the negative forces in your life. | Create a Motivational Frame from the supplied frame and mosaic pieces. Place a picture of something inspirational to motivate yourself. | Decorate the card in the box. Write a message, a poem or an inspirational quote in the card and give it to someone in your life you need to reconnect with. Take control. | Stir the creative juices by completely covering your block by finger-painting. | Collage the inside of the block with magazine clipping and photos of the person you see yourself as in the future. This is essentially a positive self-portrait of yourself. |
| Techniques | Using acrylic paint supplied in tubes, the sponge and the bubble paint, decorate your pot. | Place clay items in the oven at 275F for 20 minutes. | Spread grout over frame and let stand for 10 minutes. Using a damp sponge to remove excess mortar. | Use jewels and paint to decorate the card. | The acrylic paint is non-toxic and water-soluble. Squeeze paint onto the box and begin finger-painting. | Use glue to attach items to inside walls of box. |
| Summary Writing Exercise | Congratulate yourself for starting. Release all thoughts and concerns by writing them down on a piece of paper. | Release all thoughts and concerns by writing them down on a piece of paper. This will clear your mind for rest. | Release all thoughts and concerns by writing them down on a piece of paper. This will clear your mind for rest. | Release all thoughts and concerns by writing them down on a piece of paper. This will clear your mind for rest. | Write briefly about how you felt about today's artistic exercise. Clear your mind by writing down all thoughts and concerns. | Congratulate yourself for you have transformed your block into a center of creativity and a source for inspiration. |

Fig. 9

APPARATUS AND METHOD FOR STIMULATING CREATIVITY, SPONTANEITY, AND INSPIRATION

FIELD OF INVENTION

The invention pertains to means for enhancing a user's state of mind. More particularly, the invention relates to devices and methods for relieving stress, frustration, perfectionism, procrastination, negativity, self-criticism and for inspiring creativity.

BACKGROUND OF THE INVENTION

Various devices and techniques have been developed for assisting individuals involved in creative pursuits such as artists, writers, designers, film producers, advertising executives, etc., to develop original and creative works. From time to time these creative individuals experience periods of blocking of their creative capabilities, that is they become unable to produce creative works. These blocking problems are often the result of one or more psychological factors stemming from internal or external stresses or the individual's reactions to them. The instant invention provides tools and techniques for addressing these factors and stimulating creativity.

U.S. Pat. No. 5,372,533 issued to Sujack is directed to an artificial cake toy and method of manufacturing same. The cake toy contemplates the exercise of creative expression by the user through the use of artistic decorative effect. The method provides a reusable mode of play in which a series of pieces of colored paper are placed upon a centerpiece which is mounted in integral assembly with a decorative tray.

U.S. Pat. No. 4,063,369 issued to Hart, discloses a visual communication tool for children in which non-worded expressions can be displayed in pictorial form. By utilizing a series of provided figures, a child is capable of creating his own storybook so as to communicate his creativity to others through the pictorial display or with accompanying explanation.

U.S. Pat. No. 5,013,246, issued to Doyle describes a personalized gift kit for promoting self-esteem and a method for its use. The promotion is achieved by identifying desirable qualities of the recipient of the gift, recording the qualities on a personalized enclosure card and inserting pre-selected chips into the provided container. The chips are preprinted with appropriate corresponding qualities demonstrated by the individual who will receive the gift. This positive feedback will enhance the individual's self-esteem.

U.S. Pat. No. 5,788,233 issued to Wolfe discloses a creative building game for stimulating creativity in children. The device includes a plurality of building blocks of different geometric shapes. Each of the building blocks has a plurality of protrusions disposed on the outer surface thereof for connection to other blocks in a variety of configurations. Rules are provided for participants to develop different creative designs in competition.

U.S. Pat. No. 5,928,050 issued to Bombach et al. describes a toy and creativity training kit. The kit includes a finger pressure sculptural and remarkable toy comprising a stretchable container such as latex partially filled with an edible or non-harmful shape retaining substance with the container having surface properties to allow marking on the surface with a normal colored marker and allowing adhesive connection of various accessories such as eyes, ears, tails, etc.

U.S. Pat. No. 5,006,000 issued to House, discloses an educational aid with substitutable magnetic items. The device stimulates learning, creativity, imagination and artistic interpretation. The principal elements in the device are flexible magnetic character pieces and geometrically shaped metallic chips which, when magnetized, form solid replicas in the shape of flexible magnetic character pieces. The metallic chips are enclosed in a container with the magnetic character pieces and the container is shaken to produce an impressionistic picture.

While other variations exist, the above-described inventions for stimulating creativity are typical of those encountered in the prior art. It is an objective of the present invention to provide a device for stimulating creativity, spontaneity and inspiration. It is a further objective to provide such stimulation while mitigating the effects of identified blocking influences such as stress, frustration, perfectionism, procrastination, negativity and self-criticism. It is a still further objective of the invention to provide the above-described capabilities in a self-contained kit that can be inexpensively produced and easily distributed. It is yet a further objective to provide a device that will stimulate creativity while permitting the user to explore new artistic media.

While some of the objectives of the present invention are disclosed in the prior art, none of the inventions found include all of the requirements identified.

SUMMARY OF THE INVENTION

The present invention addresses many of the deficiencies of prior inventions for stimulating creativity and satisfies all of the objectives described above.

An apparatus for stimulating creativity, spontaneity and inspiration providing the desired features may be constructed from the following components. A container is provided. The container has a removable lid, interior surfaces and exterior surfaces. A series of journal writing exercises are provided. Each of the journal writing exercises is focused upon one of a group of identified blocking influences. A series of life exercises is provided. Each of the life exercises is a physical or mental activity for life style enhancement and is focused upon one of a group of methods of stimulating creative processes.

A series of artistic exercises is provided. Each of the artistic exercises is focused upon one of a group of artistic media. A collection of art supplies is provided. The art supplies are suitable for completion of the artistic exercises. A series of summary writing exercises is provided. Each of the summary writing exercises is focused on recording the results of each of the journal writing, life and artistic exercises. When a user opens the container and completes each of the exercises as instructed, the user will mitigate effects of the identified blocking influences and increase his creativity, spontaneity, and inspiration.

In a variant of the invention, the identified blocking influences are selected from the group including: stress, negativity, procrastination, frustration, perfectionism and self-criticism.

In a further variant, the apparatus for stimulating creativity, spontaneity, and inspiration, further includes a series of mission statements. Each of the mission statements addresses one of the identified blocking influences.

In still a further variant of the invention, a series of tips is provided. Each of the tips provides practical advice regarding means for mitigating effects of one of the identified blocking influences.

In another variant, a series of techniques is provided. Each of the techniques addresses means for utilizing the art supplies to complete one of the series of artistic exercises.

In yet another variant of the invention, the journal writing exercises, life exercises, artistic exercises and summary writing exercises are organized into a structured program. The structured program includes a series of predetermined time periods. One of each of the journal writing, life, artistic and summary writing exercises is to be completed in one of the predetermined time periods. Each of the journal writing, life, artistic and summary writing exercises to be completed in one of the predetermined time periods is focused on one of the identified blocking influences.

In still another variant, the structured program further includes one of each of the mission statements, tips, and techniques identified for each predetermined time period.

In yet another variant of the invention, the container is in the form of a cube. The cube has a removable upper portion that serves as the lid. The cube has six exterior surfaces. Each of the exterior surfaces is identified with one of the group of identified blocking influences. Each of the exterior surfaces is capable of decoration. The cube has six interior surfaces. Each of the interior surfaces is capable of decoration. The cube is usable as part of the art supplies for completion of one of the artistic exercises.

In a further variant, the lid includes an inner compartment. The compartment is sized and shaped to store the exercises.

In still a further variant, the art supplies are selected from the group including: paint, sponges, glue, clay, tiles, grout, beads, feathers, flowers, seeds, bows, sequins, jewels, ceramics, frames and note cards.

In yet a further variant, an instruction card is provided. The instruction card describes the apparatus, the inner compartment and the exercises.

In a final variant of the invention, a method for stimulating creativity, spontaneity, and inspiration including the following steps: Obtaining an apparatus for stimulating creativity, spontaneity, and inspiration. Determining a time period over which to practice the method. Opening the container. Reading the instruction card. Reading the mission statement for the first predetermined time period. Reading and completing the journal writing exercise for the first predetermined time period. Reading and utilizing the tips for completing the life exercise for the first predetermined time period. Reading and completing the life exercise for the first predetermined time period.

Reading and completing the artistic exercise for the first predetermined time period utilizing selected portions of the art supplies and techniques described. Reading and completing the summary writing exercises for the first predetermined time period. Reading the mission statement, tips and techniques and reading and completing the journal writing, life, artistic, and the summary writing exercises for each succeeding predetermined period until all of the exercises have been completed. When all of the journal writing, life, artistic, and the summary writing exercises have been completed, the user will have mitigated the effects of the identified blocking influences and increased his creativity, spontaneity, and inspiration.

An appreciation of the other aims and objectives of the present invention and an understanding of it may be achieved by referring to the accompanying drawings and the detailed description of a preferred embodiment.

DESCRIPTION OF THE DRAWINGS

FIG. 8 is a schematic view of a structured program for the FIG. 1 embodiment; and FIG. 9 is a schematic view of a structured program for the FIG. 1 embodiment further including mission statements, tips and techniques integrated with the exercises.

DETAILED DESCRIPTION OF THE PREFERRED EMBODIMENT

Figure 1:
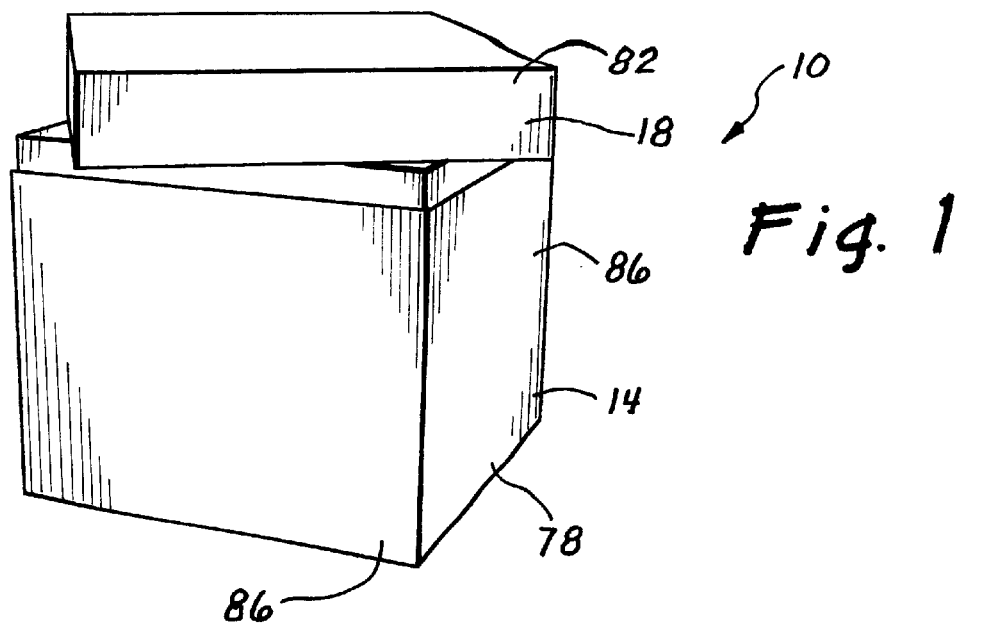
FIG. 1 is a perspective view of the container of the preferred embodiment of the invention with removable lid.

FIGS. 1–9 illustrate an apparatus 10 for stimulating creativity, spontaneity and inspiration providing the desired features that may be constructed from the following components. As illustrated in FIGS. 1, 2, 3, 4 and 7, a container 14 is provided. The container 14 has a removable lid 18, interior surfaces 22 and exterior surfaces 26. A series of journal writing exercises 30 are provided. Each of the journal writing exercises 30 is focused upon one of a group of identified blocking influences 34. A series of life exercises 38 is provided. Each of the life exercises 38 is a physical or mental activity for life style enhancement and is focused upon one of a group of methods of stimulating creative processes.

Figure 6:
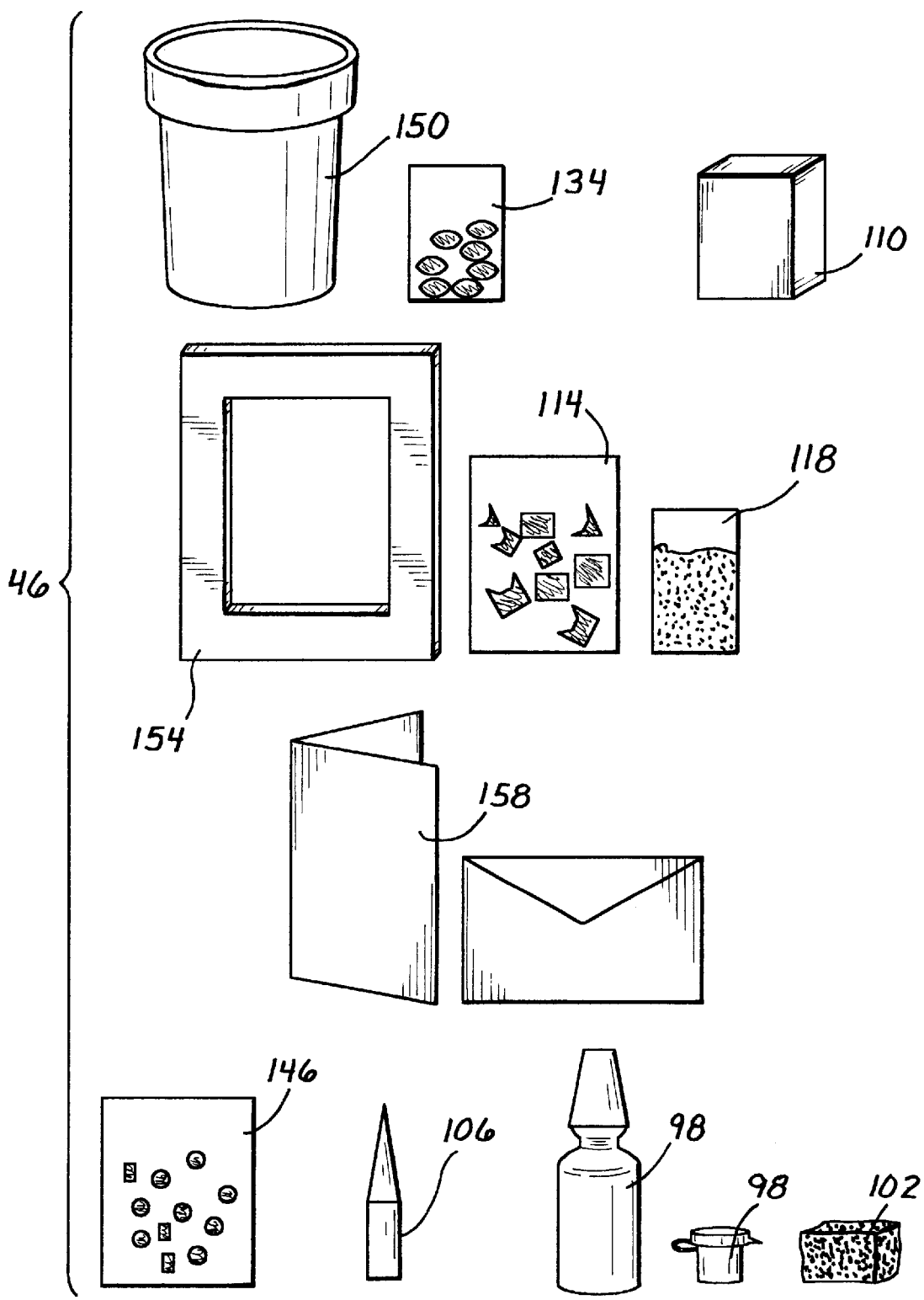
FIG. 6 is a perspective view of art supplies included for use with the FIG. 1 embodiment.
Figure 7:
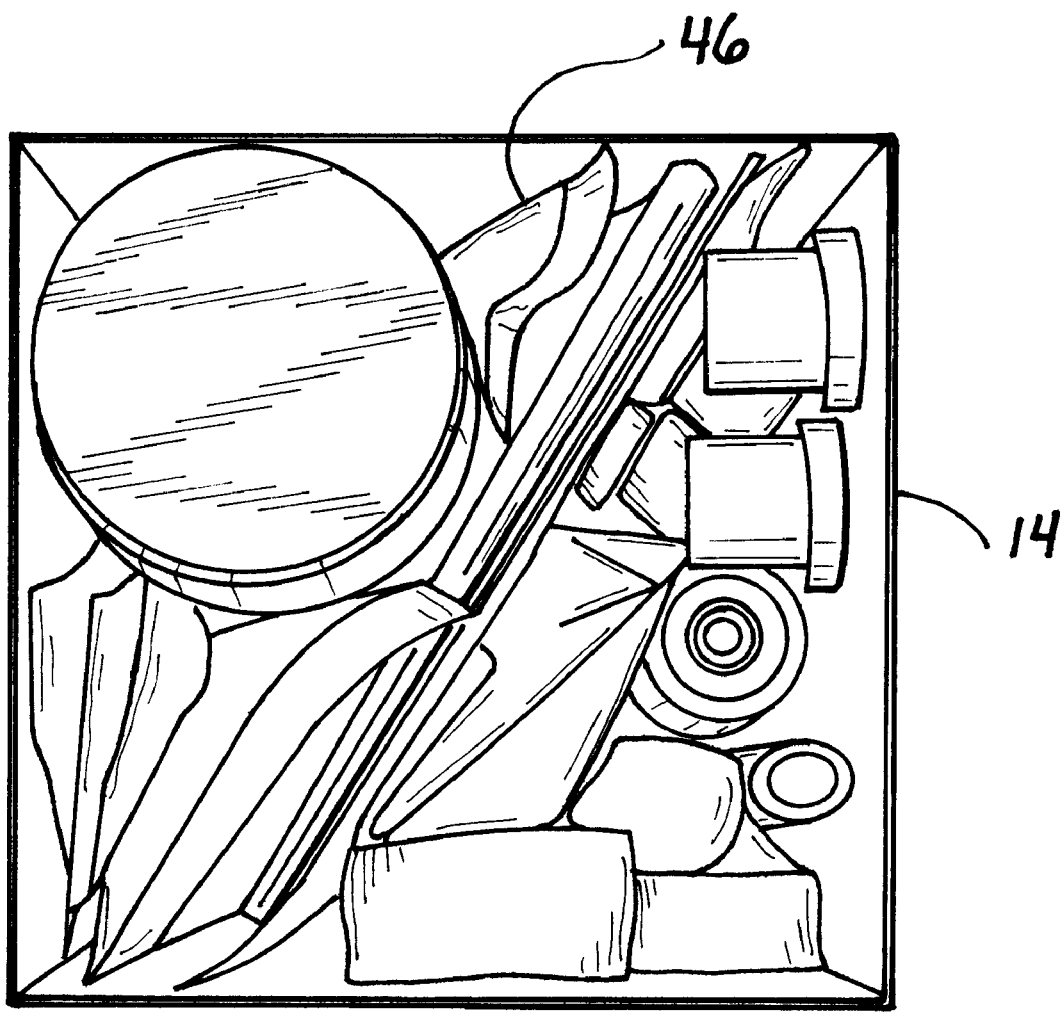
FIG. 7 is a plan view of the container of the FIG. 1 embodiment with enclosed art supplies.

A series of artistic exercises 42 is provided. Each of the artistic exercises 42 is focused upon one of a group of artistic media. As illustrated in FIGS. 6 and 7, a collection of art supplies 46 is provided. The art supplies 46 are suitable for completion of the artistic exercises 42. A series of summary writing exercises 54 is provided. Each of the summary writing exercises 54 is focused on recording the results of each of the journal writing 30, life 38 and artistic 42 exercises. When a user opens the container 14 and completes each of the exercises 30, 38, 42 and 54 as instructed, the user will mitigate effects of the identified blocking influences 34 and increase his creativity, spontaneity, and inspiration.

In a variant of the invention, as illustrated in FIGS. 8 and 9, the identified blocking influences 34 are selected from the group including: stress, negativity, procrastination, frustration, perfectionism and self-criticism.

In a further variant, as illustrated in FIG. 9, the apparatus for stimulating creativity, spontaneity, and inspiration, further includes a series of mission statements 58. Each of the mission statements addresses one of the identified blocking influences 34.

In still a further variant of the invention, a series of tips 62 is provided. Each of the tips 62 provides practical advice regarding means for mitigating effects of one of the identified blocking influences 34.

In another variant, a series of techniques 66 is provided. Each of the techniques 66 addresses means for utilizing the art supplies 46 to complete one of the series of artistic exercises 42.

In yet another variant of the invention, as illustrated in FIGS. 8 and 9, the journal writing exercises 30, life exercises 38, artistic exercises 42 and summary writing exercises 54 are organized into a structured program 70. The structured program 70 includes a series of predetermined time periods 74. One of each of the journal writing 30, life 38, artistic 42 and summary writing 54 exercises is to be completed in one of the predetermined time periods 74. Each of the journal writing 30, life 38, artistic 42 and summary writing 54 exercises to be completed in one of the predetermined time periods 74 is focused on one of the identified blocking influences 34.

In still another variant, as illustrated in FIG. 9, the structured program 70 further includes one of each of the mission statements 58, tips 62, and techniques 66 identified for each predetermined time period 74.

Figure 2:
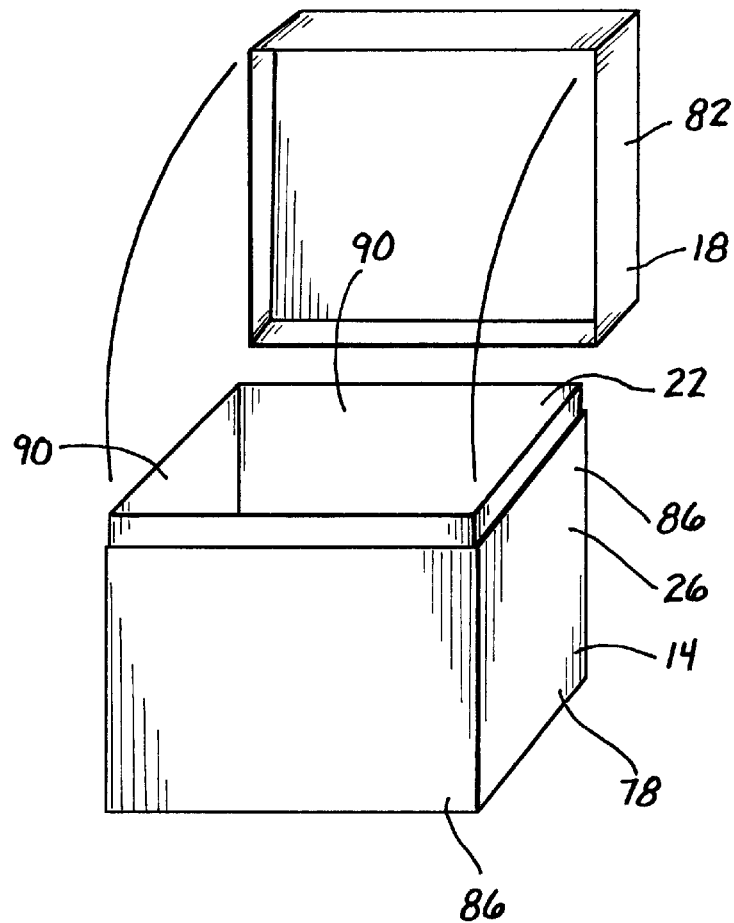
FIG. 2 is an alternative perspective view of the container of the FIG. 1 embodiment illustrating the interior surfaces of the container and the lid.

In yet another variant of the invention, as illustrated in FIGS. 1 and 2, the container 14 is in the form of a cube 78. The cube 78 has a removable upper portion that serves as the lid 82. The cube 78 has six exterior surfaces 86. Each of the exterior surfaces 86 is identified with one of the group of identified blocking influences 34. Each of the exterior surfaces 86 is capable of decoration. The cube 78 has six interior surfaces 90. Each of the interior surfaces 90 is capable of decoration. The cube 78 is usable as part of the art supplies 46 for completion of one of the artistic exercises 42.

Figure 3:
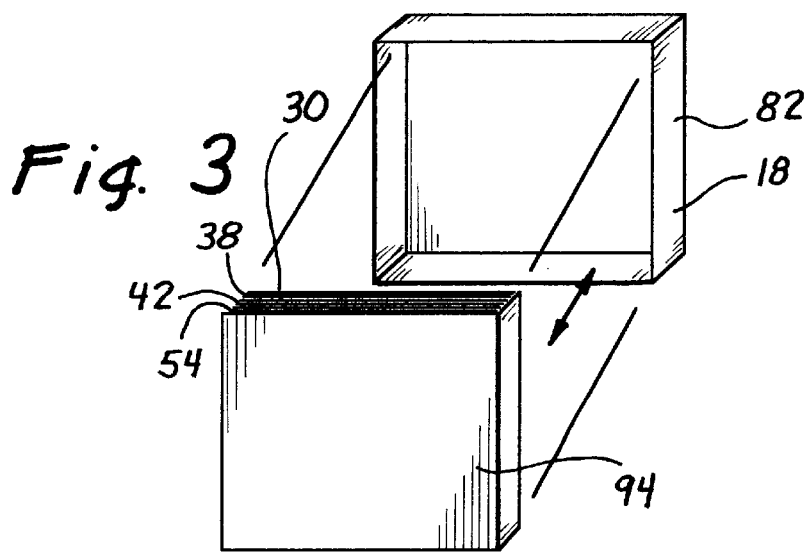
FIG. 3 is a perspective view of the lid illustrating an inner compartment of the lid.
Figure 4:
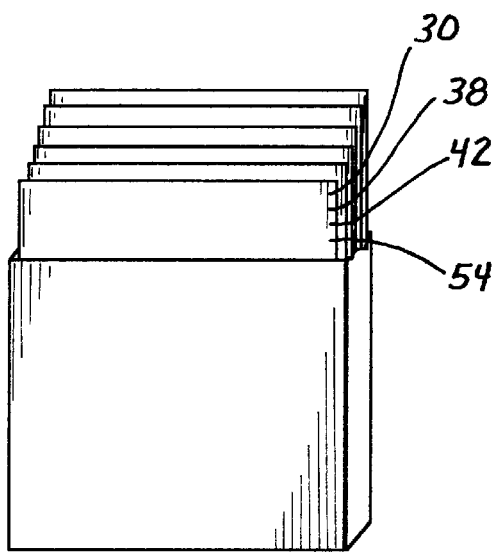
FIG. 4 is a perspective view of the inner compartment with enclosed exercises.

In a further variant, as illustrated in FIGS. 3 and 4, the lid 82 includes an inner compartment 94. The compartment 94 is sized and shaped to store the exercises 30, 38, 42 and 54.

In still a further variant, as illustrated in FIG. 6, the art supplies 46 are selected from the group including: paint 98, sponges 102, glue 106, clay 110, tiles 114, grout 118, beads (not shown), feathers (not shown), flowers (not shown), seeds 134, bows (not shown), sequins (not shown), jewels 146, ceramics 150, frames 154 and note cards 158.

Figure 5:
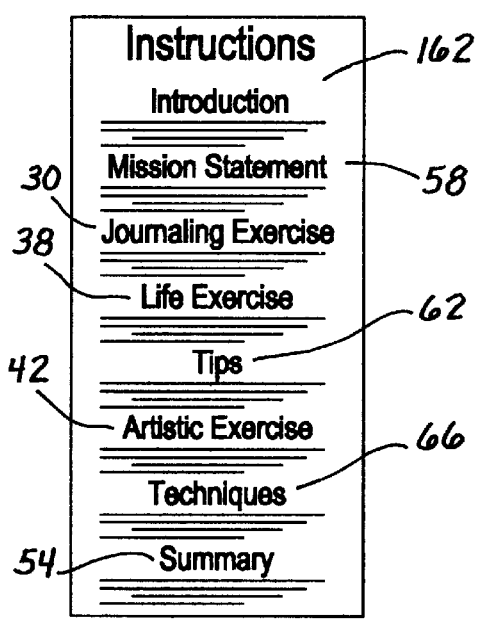
FIG. 5 is a schematic view of an instruction sheet for the FIG. 1 embodiment.

In yet a further variant, as illustrated in FIG. 5, an instruction card 162 is provided. The instruction card 162 describes the apparatus 10, the inner compartment 94 and the exercises 30, 38, 42 and 54.

In a final variant of the invention, as illustrated in FIGS. 1–9, a method for stimulating creativity, spontaneity, and inspiration including the following steps: Obtaining an apparatus 10 for stimulating creativity, spontaneity, and inspiration. Determining a time period over which to practice the method. Opening the container 14. Reading the instruction card 162. Reading the mission statement 58 for the first predetermined time period 74. Reading and completing the journal writing exercise 30 for the first predetermined time period 74. Reading and utilizing the tips 62 for completing the life exercise 38 for the first predetermined time period 74. Reading and completing the life exercise 38 for the first predetermined time period 74.

Reading and completing the artistic exercise 42 for the first predetermined time period 74 utilizing selected portions of the art supplies 46 and techniques 66 described. Reading and completing the summary writing exercises 54 for the first predetermined time period 74. Reading the mission statement 58, tips 62 and techniques 66 and reading and completing the journal writing 30, life 38, artistic 42, and the summary writing 54 exercises for each succeeding predetermined period 74 until all of the exercises 30, 38, 42 and 54 have been completed. When all of the journal writing 30, life 38, artistic 42, and the summary writing 54 exercises have been completed, the user will have mitigated the effects of the identified blocking influences 34 and increased his creativity, spontaneity, and inspiration.

The apparatus 10 for stimulating creativity, spontaneity and inspiration and related method have been described with reference to particular embodiments. Other modifications and enhancements can be made without departing from the spirit and scope of the claims that follow.

What is claimed is:

1. An apparatus for stimulating creativity, spontaneity, and inspiration, comprising:
   a container, said container having a removable lid, interior surfaces and exterior surfaces;
   a series of journal writing exercises, each of said journal writing exercises being focused upon one of a group of identified blocking influences;
   a series of life exercises, each of said life exercises being either of physical and mental activities for life style enhancement and being focused upon one of a group of methods of stimulating creative processes;
   a series of artistic exercises, each of said artistic exercises being focused upon one of a group of artistic media;
   a collection of art supplies, said art supplies suitable for completion of said artistic exercises;
   a series of summary writing exercises, each of said summary writing exercises being focused on recording the results of each of said journal writing, life and artistic exercises; and
   whereby, when a user opens the container and completes each of the exercises as instructed, the user will mitigate effects of the identified blocking influences and increase his creativity, spontaneity, and inspiration.

2. An apparatus for stimulating creativity, spontaneity, and inspiration, as described in claim 1, wherein the identified blocking influences are selected from the group comprising:
   stress, negativity, procrastination, frustration, perfectionism and self-criticism.

3. An apparatus for stimulating creativity, spontaneity, and inspiration, as described in claim 1, further comprising a series of mission statements, each of said mission statements addressing one of the identified blocking influences.

4. An apparatus for stimulating creativity, spontaneity, and inspiration, as described in claim 1, further comprising a series of tips, each of said tips providing practical advice regarding means for mitigating effects of one of the identified blocking influences.

5. An apparatus for stimulating creativity, spontaneity, and inspiration, as described in claim 1, further comprising a series of techniques, each of said techniques addressing means for utilizing the art supplies to complete one of the series of artistic exercises.

6. An apparatus for stimulating creativity, spontaneity, and inspiration, as described in claim 5, further comprising an instruction card, said instruction card describing the apparatus, the inner compartment and the exercises.

7. An apparatus for stimulating creativity, spontaneity, and inspiration, as described in claim 1, wherein the journal writing exercises, life exercises, artistic exercises and summary writing exercises are organized into a structured program, said structured program comprising:
   a series of predetermined time periods;
   one of each of said journal writing, life, artistic and summary writing exercises to be completed in one of said predetermined time periods; and
   each of said journal writing, life, artistic and summary writing exercises to be completed in one of said predetermined time periods to be focused on one of the identified blocking influences.

8. An apparatus for stimulating creativity, spontaneity, and inspiration, as described in claim 7, wherein the structured program further comprises one of each of said mission statements, tips, and techniques identified for each predetermined time period.

9. An apparatus for stimulating creativity, spontaneity, and inspiration, as described in claim 1, wherein:

said container is in the form of a cube, said cube having a removable upper portion, said upper portion serving as the lid;

said cube having six exterior surfaces, each of said exterior surfaces being identified with one of said group of identified blocking influences;

each of said exterior surfaces being capable of decoration;

said cube having six interior surfaces, each of said interior surfaces being capable of decoration; and whereby, the cube is usable as part of the art supplies for completion of one of the artistic exercises.

10. An apparatus for stimulating creativity, spontaneity, and inspiration, as described in claim 9, wherein the lid further comprises an inner compartment, said compartment being sized and shaped to store said exercises.

11. An apparatus for stimulating creativity, spontaneity, and inspiration, as described in claim 1, wherein the art supplies are selected from the group comprising:

paint, sponges, glue, clay, tiles, grout, beads, feathers, flowers, seeds, bows, sequins, jewels, ceramics, frames and note cards.

12. A method for stimulating creativity, spontaneity, and inspiration comprising the following steps:

obtaining an apparatus for stimulating creativity, spontaneity, and inspiration, as described in claims 1–11;

determining a time period over which to practice the method;

opening the container;

reading the instruction card;

reading the mission statement for the first predetermined time period;

reading and completing the journal writing exercise for the first predetermined time period;

reading and utilizing the tips for completing the life exercise for the first predetermined time period;

reading and completing the life exercise for the first predetermined time period;

reading and completing the artistic exercise for the first predetermined time period utilizing selected portions of the art supplies and techniques described;

reading and completing the summary writing exercises for the first predetermined time period;

reading the mission statement, tips and techniques and reading and completing the journal writing, life, artistic, and the summary writing exercises for each succeeding predetermined period until all of the exercises have been completed; and whereby, when all of the journal writing, life, artistic, and the summary writing exercises have been completed, the user will have mitigated the effects of the identified blocking influences and increased his creativity, spontaneity, and inspiration.

* * * * *